United States Patent
Carlough et al.

(10) Patent No.: US 9,870,200 B2
(45) Date of Patent: *Jan. 16, 2018

(54) DECIMAL AND BINARY FLOATING POINT ROUNDING

(71) Applicant: International Business Machines Corporation, Armonk, NY (US)

(72) Inventors: Steven R. Carlough, Poughkeepsie, NY (US); Klaus M. Kroener, Ehningen (DE); Petra Leber, Ehningen (DE); Cedric Lichtenau, Stuttgart (DE); Silvia M. Mueller, Altdorf (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/354,151

(22) Filed: Nov. 17, 2016

(65) Prior Publication Data

US 2017/0068517 A1    Mar. 9, 2017

Related U.S. Application Data

(63) Continuation of application No. 14/873,450, filed on Oct. 2, 2015.

(30) Foreign Application Priority Data

Oct. 6, 2014  (GB) .................................. 1417580.6

(51) Int. Cl.
*G06F 7/00* (2006.01)
*G06F 7/485* (2006.01)
*G06F 7/499* (2006.01)

(52) U.S. Cl.
CPC .......... *G06F 7/485* (2013.01); *G06F 7/49915* (2013.01); *G06F 7/49947* (2013.01)

(58) Field of Classification Search
CPC .................................................. G06F 7/49947
(Continued)

(56) References Cited

U.S. PATENT DOCUMENTS 6,205,461 B1    3/2001   Mansingh
7,054,898 B1    5/2006   Tzeng et al.
(Continued)

OTHER PUBLICATIONS

Wang et al., "Decimal Floating-Point Adder and Multifunction Unit with Injection-Based Rounding," 18th IEEE Symposium on Computer Arithmetic, ARITH '07, Jun. 25-27, 2007, 10 pages. DOI: 10.1109/ARITH.2007.13.
(Continued)

*Primary Examiner* — Tan V. Mai
(74) *Attorney, Agent, or Firm* — Jay Wahlquist (57) ABSTRACT

Arithmetic logic circuitry is provided for performing a floating point arithmetic add/subtract operation on first and second floating point numbers. The method includes: generating a guard digit for the first or second number by transforming the first and second numbers by a compressing function; determining a result depending on the arithmetic operation, a sum of the transformed floating point numbers, and first and second differences of the transformed floating point numbers, and determining a corresponding result plus one by additionally adding a value of one to the result; generating injection values for rounding the final result; generating injection carry values based on the transformed first and second numbers and the injection values; and selecting the final result from the result, the result plus one, and a least significant digit, based on the injection carry values and the end around carry signals.

10 Claims, 8 Drawing Sheets

(58) Field of Classification Search
USPC .................................................. 708/201, 204
See application file for complete search history.

(56) References Cited

U.S. PATENT DOCUMENTS

| | | |
|---|---|---|
| 7,519,645 B2 | 4/2009 | Carlough et al. |
| 7,546,328 B2 | 6/2009 | Schulte et al. |
| 7,552,165 B2 | 6/2009 | Purcell |
| 8,117,426 B2 | 2/2012 | Hansen et al. |
| 8,161,090 B2 | 4/2012 | Swartzlander, Jr. et al. |
| 8,161,091 B2 | 4/2012 | Carlough et al. |
| 8,407,275 B2 | 3/2013 | Boersma et al. |
| 8,554,822 B2 | 10/2013 | Carlough et al. |
| 8,572,141 B2 | 10/2013 | Carlough et al. |
| 8,601,047 B2 | 12/2013 | Wang |
| 8,645,449 B1 | 2/2014 | Langhammer |
| 2006/0047738 A1* | 3/2006 | Schwarz ............. G06F 7/491 708/490 |
| 2006/0047739 A1 | 3/2006 | Schulte et al. |
| 2010/0312812 A1 | 12/2010 | Wang |
| 2013/0124588 A1 | 5/2013 | Kroener et al. |
| 2014/0019506 A1 | 1/2014 | Kuo |
| 2014/0095563 A1 | 4/2014 | Lundvall et al. |

OTHER PUBLICATIONS

Tsen et al., "Hardware Design of a Binary Integer Decimal-Based Floating-Point Adder," 25th International Conference on Computer Design, ICCD 2007, Oct. 7-10, 2007, pp. 288-295.

Wang et al., "Hardware Designs for Decimal Floating-Point Addition to Related Operations," IEEE Transactions on Computers, vol. 58, No. 3, Mar. 2009, pp. 322-335.

Schwarz et al., "Decimal Floating-Point Support on the IBM System z10 Processor," IBM Journal of Research & Development, vol. 58, No. 1, Paper 4, 2009, pp. 1-10.

El-Ghamrawy, K., A Mixed Decimal/Binary Redundant Floating-Point Adder, Thesis for the Degree of Master of Science in Electronics and Communications Engineering, Cairo University, 2011, 78 pages.

Bailey, D., "High-Precision Computation: Applications and Challenges," Keynote 1, 21st IEEE Symposium on Computer Arithmetic, ARITH 2013, Jun. 25, 2013, 1 page. DOI: 10.1109/ARITH.2013.39.

IEEE Computer Society, "IEEE Standard for Floating-Point Arithmetic," IEEE Std 754™-2008, Aug. 29, 2008 (Approved Jun. 12, 2008), 70 pages.

Search Report for United Kingdom Application No. GB1417580.6 (filed Oct. 6, 2014), dated Apr. 15, 2015, 4 pages.

Search Report for United Kingdom Application No. GB1417582.2 (filed Oct. 6, 2014), dated Apr. 15, 2015, 3 pages.

Examination Report for United Kingdom Application No. GB1417580.6, dated May 4, 2016, 4 pages.

Notification of Grant for United Kingdom Application No. GB1417580.6, dated Jul. 19, 2016, 2 pages.

Carlough et al., "Decimal and Binary Floating Point Rounding," U.S. Appl. No. 14/873,450, filed Oct. 2, 2015.

List of IBM Patents or Patent Applications Treated as Related, Signed Nov. 15, 2016, 2 pages.

* cited by examiner

| cout0 (msd) | cout1 (msd) | cj | ck | Final Result | Comment |
|---|---|---|---|---|---|
| 0 | * | 0 | * | Sum 66, gj 60 | 1st rounding position 32. |
| * | 0 | 1 | * | sum+1 69, gj 60 | |
| 1 | * | 0 | 0 | Sum 66 | 2nd rounding position 33 |
| 1 | * | 0 | 1 | sum+1 69 | |
| * | 1 | 1 | 1 | sum+1 69 | |

DECIMAL AND BINARY FLOATING POINT ROUNDING

PRIOR FOREIGN APPLICATION

This application claims priority from United Kingdom (GB) patent application number 1417580.6, filed Oct. 6, 2014, which is hereby incorporated herein by reference in its entirety.

BACKGROUND

The present invention relates in general to data processing systems, and in particular, to an arithmetic logic circuitry for performing a floating point arithmetic add/subtract operation in decimal or binary floating point format.

The "IEEE-754R Standard for Binary Floating point Arithmetic" specifies a floating point data architecture that is commonly implemented in computer hardware, such as floating point processors having multipliers. The format consists of a sign, an unsigned biased exponent, and a significand. The sign bit is a single bit and is represented by an "S". The unsigned biased exponent, represented by an "e," is e.g. 8 bits long for single precision, 11 bits long for double precision and 15 bits long for quad precision. The significand is e.g. 24 bits long for single precision, 53 bits long for double precision and 112 bits long for quad precision.

Decimal floating point has been used in calculators for many years but the latest revision of the IEEE standard for floating point numbers, IEEE-754R, includes a decimal floating point format. Addition and subtraction are the primary arithmetic instructions and they are critical to the performance of a decimal floating point unit. Floating point arithmetic is more complex than fixed point arithmetic due to the requirement to align the operations. Decimal floating point formats, as defined by the IEEE 754R standard, include a double word format containing sixteen digits for the coefficient and a quad word format containing thirty-four digits for the coefficient. The coefficients are integer and are not normalized and therefore, can contain leading zeroes. With the advent of the new standard and the increase of financial workloads that rely on decimal arithmetic operations, it becomes desirable to implement these operations at a high performance.

U.S. Pat. No. 8,161,091 B2 discloses a system for performing a decimal floating point operation. The system includes an adder, a final result selector, and a mechanism for receiving a first operand including a first coefficient and a first exponent. The mechanism also receives a second operand including a second coefficient and a second exponent. An operation associated with the first operand and the second operand is received, where the operation is an addition or a subtraction. Three concurrent calculations are performed on the first operand and the second operand. The first concurrent calculation includes applying the operation to the first operand and the second operand based on a first assumption that the first exponent is equal to the second exponent. Then applying the operation based on the first assumption results in a first result and includes utilizing the adder. The second concurrent calculation includes applying the operation to the first operand and the second operand based on a second assumption that an absolute difference between the first exponent and the second exponent is less than or equal to a number of leading zeroes in the larger of the first operand and the second operand. Then applying the operation based on the second assumption results in a second result and includes utilizing the adder. The third concurrent calculation includes applying the operation to the first operand and the second operand based on a third assumption that the absolute difference between the first exponent and the second exponent is greater than the number of leading zeroes in the larger of the first operand and the second operand. Then applying the operation based on the third assumption results in a third result and includes utilizing the adder. A final result is selected by the final result selector from the first result, the second result and the third result.

SUMMARY

In one or more aspects, a logic device is provided which includes arithmetic logic circuitry for performing a floating point arithmetic add/subtract operation on a first floating point number and a second floating point number. The first floating point number has a first magnitude and the second floating point number has a second magnitude, and the first and second floating point numbers are both in decimal or binary floating point format. The arithmetic logic circuitry is configured to perform a method which includes: in case of the floating point numbers being in binary floating point format, mapping the binary floating point numbers to a decimal floating point format, the mapping comprising padding bits to form digits that share the same fields of the floating point numbers in the decimal floating point format; generating a guard digit of zero of at least one of the first or the second floating point number by transforming the first and the second floating point numbers by a compressing function; determining as a result depending on the arithmetic operation, a sum of the transformed floating point numbers, and a first difference or a second difference of the transformed floating point numbers, wherein for the first difference, the second floating point number is subtracted from the first floating point number, and the for the second difference, the first floating point number is subtracted from the second floating point number, and determining a corresponding result plus one by additionally adding a value of one to the result; generating injection values for rounding a final result in dependence of the first and second floating point numbers being in decimal floating point format or binary floating point format, of a rounding mode and of the arithmetic operation; generating injection carry values based on the transformed first and second floating point numbers and the injection values; and selecting the final result from the result, the result plus one, and a least significant digit based on the injection carry values and end around carry signals.

In one or more other aspects, a logic method is presented comprising: performing a floating point arithmetic add/subtract operation on a first floating point number and a second floating point number, where the first floating point number has a first magnitude and the second floating point number has a second magnitude, and wherein the first and second floating point numbers either both in decimal or binary floating point format. The method includes: in case of the floating point numbers being in binary floating point format, mapping the binary floating point numbers to decimal floating point format, the mapping comprising padding bits to form digits that share the same fields of the floating point numbers in the decimal floating point format; generating a guard digit of zero of at least one of the first or the second floating point number by transforming the first and the second floating point numbers by a compressing function; determining as a result depending on the arithmetic operation, a sum of the transformed floating point numbers, and a first difference or a second difference of the transformed floating point numbers, wherein for the first difference, the second floating point number is subtracted from the first floating point number, and the for the second difference, the first floating point number is subtracted from the second floating point number, and determining a corresponding result plus one by additionally adding a value of one to the result; generating injection values for rounding a final result in dependence of the first and second floating point numbers being in decimal floating point format or binary floating point format, of a rounding mode and of the arithmetic operation; generating injection carry values based on the transformed first and second floating point numbers and the injection values; and selecting the final result from the result, the result plus one, and a least significant digit based on the injection carry values and end around carry signals.

In one or more further aspects, a computer program product is provided for performing a floating point arithmetic add/subtract operation on a first floating point number and a second floating point number. The computer program product includes a computer readable storage medium having program instructions embodied therewith, the program instructions being executable by a processor to cause the processor to perform a method comprising: in the in case of the floating point numbers being in binary floating point format, mapping the binary floating point numbers to a decimal floating point format, the mapping comprising padding bits to form digits that share the same fields of the floating point numbers in the decimal floating point format; generating a guard digit of zero of at least one of the first or the second floating point numbers by transforming the first and the second floating point numbers by a compressing function; determining as a result depending on the arithmetic operation, a sum of the transformed floating point numbers, and a first difference or a second difference of the transformed floating point numbers, wherein for the first difference, the second floating point number is subtracted from the first floating point number, and the for the second difference, the first floating point number is subtracted from the second floating point number, and determining a corresponding result plus one by additionally adding a value of one to the result; generating injection values for rounding a final result in dependence of the first and second floating point numbers being in decimal floating point format or binary floating point format, of a rounding mode and of the arithmetic operation; generating injection carry values based on the transformed first and second floating point numbers and the injection values; and selecting the final result from the result, the result plus one, and a least significant digit based on the injection carry values and end around carry signals.

BRIEF DESCRIPTION OF THE DRAWINGS

The present invention, together with certain objects and advantages thereof, may best be understood from the following detailed description of one or more embodiments thereof, but not restricted to the embodiments discussed. In the accompanying drawings.

DETAILED DESCRIPTION

Those skilled in the art will note from the description provided herein that an objective of the present invention is to provide an arithmetic logic circuitry for performing a floating point arithmetic add/subtract operation with decimal and binary floating point rounding with improved efficiency and performance.

Another objective is to provide a method for performing a floating point arithmetic add/subtract operation with decimal and binary floating point rounding with improved efficiency and performance as well as a data processing system for implementing such a method.

These objectives are achieved by the features of the independent claims. The other claims, the drawings and the specification disclose advantageous embodiments of the invention.

According to one aspect of the present invention, an arithmetic logic circuitry is provided for performing a floating point arithmetic add/subtract operation on a first floating point number and a second floating point number, wherein the first floating point number has a first magnitude and the second floating point number has a second magnitude, and wherein the first and second floating point numbers are both in the same of either decimal or binary floating point format. The arithmetic logic circuitry is configured for implementing a method comprising (i) in case of the floating point numbers being in a binary floating point format, mapping the binary floating point numbers to a decimal floating point format, by padding bits to form digits in order to share the same fields as in case of the floating point numbers being in a decimal floating point format. Further the method comprises (ii) generating a guard digit of zero of at least one of the first or the second floating point number by transforming the first and the second floating point number by a compressing function; and (iii) computing as a result depending on the arithmetic operation a sum of the transformed floating point numbers, a first difference or a second difference of the transformed floating point numbers, wherein for the first difference the second floating point number is subtracted from the first floating point number and for the second difference the first floating point number is subtracted from the second floating point number and computing a corresponding result plus one by additionally adding a value of one to the result; as well as (iv) generating injection values for rounding a final result in dependence of the first and second floating point numbers being in a decimal floating point format or a binary floating point format, of a rounding mode and of the arithmetic operation. The method additionally comprises (v) generating injection carry values based on the transformed first and second floating point numbers and the injection values; and finally (vi) selecting the final result from the result, the result plus one and a least significant digit based on the injection carry values and end around carry signals.

In the case of the floating point numbers being in decimal format, the mapping step (i) may be omitted and the decimal floating point numbers are fed directly to the further processing steps for compressing and rounding functions.

Both business analytics and high-performance computing have noticed significant limitations with 64 bit (64 b) binary floating point (BFP) arithmetic. From both sides, there have been requests for fast hardware support for BFP-128b arithmetic. The customer requirement is to get a fully pipelined execution (higher throughput) and a latency close to that of BFP-64b.

The present invention enhances a 128b decimal floating point unit (DFU) to also execute BFP-128b in the same hardware, in a fully pipelined fashion. That requires an arithmetical engine to support decimal and binary arithmetic, and to support decimal and binary IEEE rounding. Enhancing a 128b decimal floating point unit in such a way significantly reduces the circuit size, power and latency as well as increases the throughput.

Decimal floating point arithmetic is challenging due to the redundant number representation for DFP specified in the IEEE-754-2008. For BFP, each number has a single representation, whereas for DFP any number can have up to 34 representations. When adding 2+2 in BFP, there is just a single representation for the result. In DFP, there are multiple representations of 2, and multiple representations of 4. Thus, it is not just the value that matters, but the standard also defines which representation is to be delivered. That makes the computation more complex than for BFP.

The present invention describes an arithmetical engine which combines the add/subtract operation, the shifting, the rounding, and the post rounding correction shift into a single, integrated operation. Prior art shows a typical hardware implementation that performs these operations requiring 9 cycles. The compound solution of this disclosure teaches reducing this 9 cycle operation to 3 cycles for a typical high performance implementation of the invention.

With the present invention, this can be performed with a special injection based rounding scheme. Injection values are constants that depend on the rounding mode used for the operation.

For BFP, a similar injection rounding with end-around-carry approach can be applied as for DFP. But DFP operates on 4-bit digits and BFP operates on bits. Thus, the BFP representation needs to be adapted, and the injection vectors have different values.

Duplicating the rounding logic would add to the area and the delay of the timing critical path. The present invention therefore maps the BFP rounding and its corrections onto the DFP dataflow without increasing the logic depths/delay of that timing critical circuitry. This is how the most significant bit (M), the guard bit (G), the rounding bit (R) and the sticky bit (S) of BFP can be mapped onto the M, G, R, S digits of the DFP solution.

The inventive solution disclosed herein shows how to find the padding bits and the new rounding injections by extending an implementation of a rounding logic for DFP to support binary rounding.

The compressing function for creating the transformed floating point numbers may, for example, be implemented by a carry save adder (CSA) compressing function, but it is possible to use any other compressing function for this purpose, too. By this way, a favorable rounding scheme comprising two rounding positions can be applied to the DFP using suitable injections for pre/post-rounding correction depending on the number of leading zero digits/bits of the final result.

In an advantageous embodiment, the arithmetic logic circuitry may further be configured to, in case of the floating point numbers in a binary floating point format, provide the fields of the mapped first and second floating point numbers have bits with value zero padded to form digits in order to share the same fields as in the floating point numbers in a decimal floating point format. Thus, it is possible to apply a decimal floating point operation to floating point numbers in binary format.

Advantageously the arithmetic logic circuitry may further be configured to generate injection carry values depending on the injection values if for rounding reasons the result plus one is selected for the final result.

Favorably, the arithmetic logic circuitry may further be configured to select the final result of the rounding process based on the injection carry values generated depending on the injection values, as well as on the arithmetic operation being an add or a subtract operation. Injection values are such that injection carry values are generated if for rounding reasons the result plus one is selected instead of the result.

In an advantageous embodiment, the arithmetic logic circuitry may further be configured to add two injection values at least at two rounding positions to the floating point numbers for rounding the final result of the arithmetic operation. Thus, a guard bit as well as a round bit may contribute to the rounding result of the add/subtract process.

Advantageously, the arithmetic logic circuitry may further be configured, in case of the floating point numbers in a binary floating point format, to use a select function to map the final result of the arithmetic operation back to the binary format, the arithmetic operation being already a binary add/subtract operation. This can be a very useful function in order to continue arithmetic operation in binary format which might be convenient in certain circumstances.

In one or more embodiments, the arithmetic logic circuitry may be configured to perform rounding of the final result of the arithmetic operation, including: (i) generating injection values depending on the floating point format; (ii) transforming the first and the second floating point number by a compressing function; (iii) detecting the rounding position depending on injection carry values and end-around-carry signals; (iv) combining the rounding process with a calculation of the sum and the first and second differences of the first and second floating point numbers. Such a process covers all essential features for performing a floating point operation with rounding in DFP for decimal, as well as for binary floating point numbers.

In an advantageous embodiment, the arithmetic logic circuitry may further be configured to determine the final result of the arithmetic operation by using a decimal compound adder, which is able to deliver a sum of the two floating point numbers as well as a sum plus one—value in parallel. Such a decimal compound adder is a state of the art component that can be used to implement in the inventive arithmetic logic circuitry disclosed herein.

Advantageously, the arithmetic logic circuitry may further be configured to select the final result depending on digit overflow resulting from performing the arithmetic operation in the decimal compound adder. This overflow determines the carry information and thereby influences the selection of the appropriate result value of the adder using end-around-carry signals.

In an advantageous embodiment, the arithmetic logic circuitry may further be configured, in case of the floating point numbers being in binary coded decimal format and in case of an add arithmetic operation, to add a number of six in padding a decimal digit with guard bits. This feature is advantageous because the decimal digits only cover a range of zero to nine. By adding a number of six this accounts for that fact, and thus a carry might be propagated in standard binary carry chain logic even for a digit representing a decimal value.

According to a further advantageous aspect of the invention, arithmetic logic circuitry is provided configured to perform a floating point arithmetic operation on a first floating point number and a second floating point number, wherein the first floating point number has a first magnitude and the second floating point number has a second magnitude, wherein the first and second floating point numbers are both in the same of either decimal or binary floating point format, and wherein one of the first or the second floating point number is implemented with a different precision than the other of the floating point numbers. The operation includes: (i) extending the fields of the floating point number with the lower precision by padding to form a third floating point number in order to share the same fields with the other floating point number; and (ii) executing the arithmetic operation on the floating point number with the higher precision and the third floating point number. This arithmetic logic circuitry, which can be implemented as the arithmetic logic circuitry described above, for example, is able to support multiple data format precisions with reduced hardware and delay. The length of the data used in this arithmetic logic circuitry may be different according to the required precision, single, double or extended precision. Padding with additional bits may be applied in order to extend shorter precision data to longer precision data. Thus, always the same test position, (for example, for overflow or end around carry) can be used, which is a cheaper and faster way of performing an arithmetic operation, where no multiplexer is needed to select a test position.

According to another advantageous aspect of the present invention, a data processing system is disclosed for implementing a binary or decimal floating point arithmetic add/subtract operation on two floating point numbers, where the system includes an arithmetic logic circuitry as described above.

According to a further advantageous aspect of the present invention, a method is provided for performing a floating point arithmetic add/subtract operation on a first floating point number and a second floating point number, wherein the first floating point number has a first magnitude and the second floating point number has a second magnitude, and wherein the first and second floating point numbers are both in the same of either decimal or binary floating point format, the method comprising: (i) in case of the floating point numbers being in a binary floating point format, mapping the binary floating point numbers to a decimal floating point format, by padding bits to form digits in order to share the same fields as in case of the floating point numbers being in a decimal floating point format. Further the method comprises (ii) generating a guard digit of zero of at least one of the first or the second floating point number by transforming the first and the second floating point number by a compressing function; and (iii) computing as a result depending on the arithmetic operation a sum of the transformed floating point numbers, a first difference or a second difference of the transformed floating point numbers, wherein for the first difference the second floating point number is subtracted from the first floating point number and for the second difference the first floating point number is subtracted from the second floating point number and computing a corresponding result plus one by additionally adding a value of one to the result; as well as (iv) generating injection values for rounding a final result in dependence of the first and second floating point numbers being in a decimal floating point format or a binary floating point format, of a rounding mode and of the arithmetic operation. The method additionally comprises: (v) generating injection carry values based on the transformed first and second floating point numbers and the injection values; and finally (vi) selecting the final result from the result, the result plus one and a least significant digit based on the injection carry values and end around carry signals.

According to a further advantageous aspect of the present invention, a data processing program for execution in a data processing system is disclosed comprising an implementation of an instruction set for performing a method as described above when the data processing program is run on a computer.

Further, a computer program product is provided herein comprising a computer usable medium including a computer readable program, wherein the computer readable program when executed on a computer causes the computer to perform a method for performing a floating point arithmetic add/subtract operation on a first floating point number and a second floating point number, the first floating point number having a first magnitude and the second floating point number having a second magnitude, and wherein the first and second floating point numbers are both in the same of either decimal or binary floating point format, and the method comprises (i) in case of the floating point numbers being in a binary floating point format, mapping the binary floating point numbers to a decimal floating point format, by padding bits to form digits in order to share the same fields as in case of the floating point numbers being in a decimal floating point format. Further the method comprises (ii) generating a guard digit of zero of at least one of the first or the second floating point number by transforming the first and the second floating point number by a compressing function; and (iii) computing as a result depending on the arithmetic operation a sum of the transformed floating point numbers, a first difference or a second difference of the transformed floating point numbers, wherein for the first difference the second floating point number is subtracted from the first floating point number and for the second difference the first floating point number is subtracted from the second floating point number and computing a corresponding result plus one by additionally adding a value of one to the result; as well as (iv) generating injection values for rounding a final result in dependence of the first and second floating point numbers being in a decimal floating point format or a binary floating point format, of a rounding mode and of the arithmetic operation. The method additionally comprises (v) generating injection carry values based on the transformed first and second floating point numbers and the injection values; and finally (vi) selecting the final result from the result, the result plus one and a least significant digit based on the injection carry values and end around carry signals.

Referring now to the drawings, where like elements are referred to with equal reference numerals. Note that the drawings are shown as exemplary embodiments, and are presented by way of example only.

Figure 1:
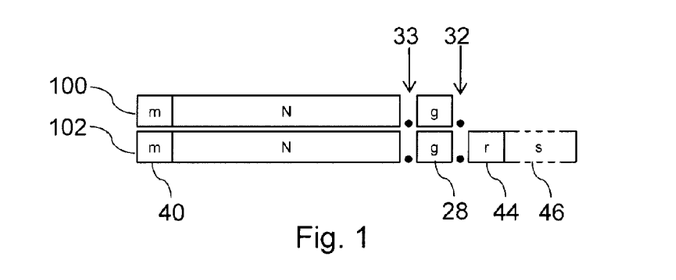
FIG. 1 depicts two floating point numbers in decimal floating point format as input for a floating point arithmetic add/subtract operation, according to one or more aspects of the present invention.

FIG. 1 depicts two floating point numbers 100, 102 in decimal floating point format as input for a floating point arithmetic add/subtract operation according to one or more embodiments of the invention. The significand of the floating point numbers 100, 102 is N−1 digits long and exhibit a most significant digit 40. There are shown a first rounding position 32 and a second rounding position 33, where guard digits 28, round digits 44 and sticky digits 46, each of the digits at least 4 bits long, are involved in the rounding process as described hereafter.

Figure 2:
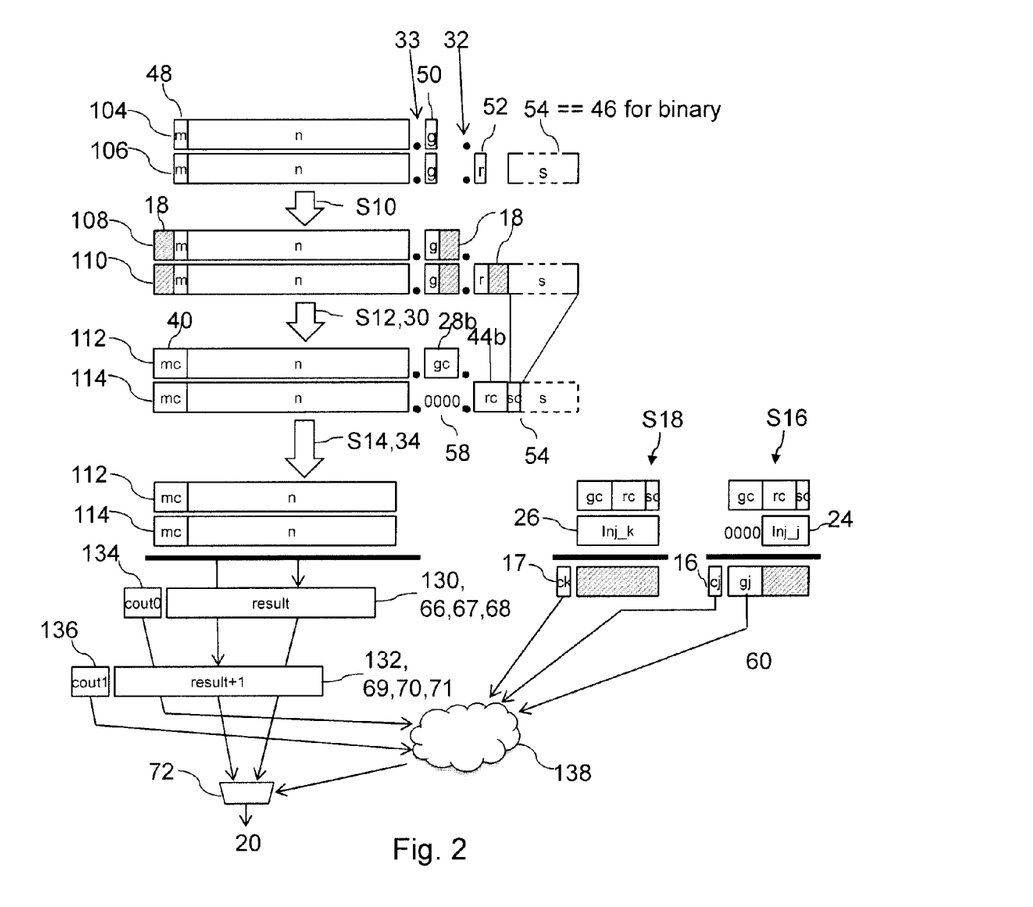
FIG. 2 shows a schematic of a floating point add/subtract arithmetic operation with two floating point numbers both in either decimal or binary floating point format, in accordance with one or more aspects of the present invention.

FIG. 2 shows a schematic for a floating point add/subtract arithmetic operation with two floating point numbers 104, 106 both in either decimal or binary floating point, format according to one or more aspects of the invention. The binary floating point numbers 104, 106 with a significand of a length of n−1 bits exhibit a most significant bit 48, as well as two rounding positions 32, 33 and guard bit 50, round bit 52, and one or more sticky bits 54.

In FIG. 2, one embodiment of the inventive method implemented on an arithmetic logic circuitry for performing a floating point arithmetic add/subtract operation on a first floating point number 100, 104 and a second floating point number 102, 106 is illustrated in detail. Herein, the first floating point number 100, 104 has a first magnitude and the second floating point number 102, 106 has a second magnitude, and the first and second floating point numbers 100, 104; 102, 106 are either in binary or decimal floating point format. The inventive method may comprise first in case of the floating point numbers 104, 106 being in a binary floating point format, mapping the binary floating point numbers 104, 106 to a decimal floating point format, by padding bits 18 to form digits in order to share the same fields as in case of the floating point numbers 100, 102 being in a decimal floating point format.

In case of the floating point numbers 100, 102 already being in decimal floating point format, the padding of the fields, as explained above, may be omitted and the floating point numbers 100, 102 may be directly fed to the next step of the process.

Second, the method may comprise generating a guard digit 28 of zero 58 of at least one of the first or the second floating point number 100, 108; 102, 110 by transforming the first and the second floating point number 100, 108; 102, 110 by a compressing function 30.

Third, the method may include computing as a result 130 depending on the arithmetic operation a sum 66 of the transformed floating point numbers 112, 114, a first difference 67 or a second difference 68 of the transformed floating point numbers 112, 114, wherein for the first difference 67, the second floating point number 114 is subtracted from the first floating point number 112, and for the second difference 68, the first floating point number 112 is subtracted from the second floating point number 114, and computing a corresponding result plus one 132 by additionally adding a value of one to the result 130. Correspondingly, a sum plus one 69, a first difference plus one 70 and a second difference plus one 71 may be determined.

Fourth, the method may comprise generating injection values 24, 26 for rounding a final result 20 in dependence of the first and second floating point numbers 100, 104; 102, 106 being in a decimal floating point format or a binary floating point format, of a rounding mode and of the arithmetic operation.

Figure 3:
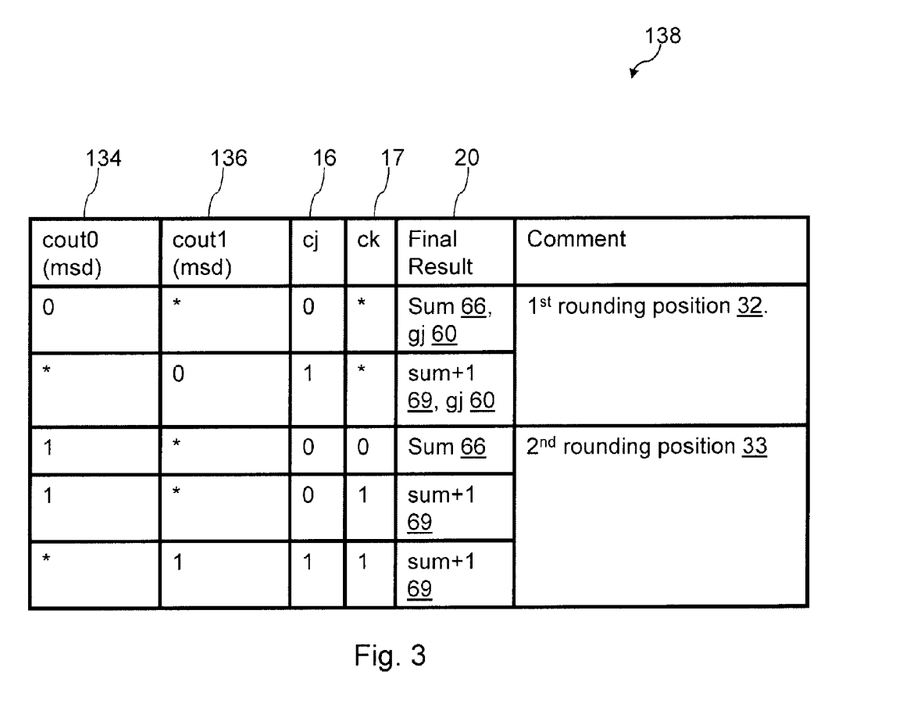
FIG. 3 depicts a selection table for selecting a final result of a floating point arithmetic operation, in accordance with one or more aspects of the present invention.

Fifth, the method may comprise generating injection carry values 16, 17 based on the transformed first and second floating point numbers 112, 114 and the injection values 24, 26 and sixth, the method may comprise selecting the final result 20 from the result 130, the result plus one 132 and a least significant digit 60 based on the injection carry values 16, 17 and the end around carry signals 134, 136, as is detailed in the table 138 contained in FIG. 3.

Arithmetic logic circuitry according to one or more aspects of the present invention may be configured to perform rounding the final result 20 of the arithmetic operation, which may comprise: (i) generating injection values 24, 26 depending on the floating point format; (ii) transforming the first and the second floating point number 100, 108; 102, 110 by a compressing function 30; (iii) detecting the rounding position depending on injection carry values 16, 17 and the end around carry signals 134, 136; and (iv) combining the rounding process with a calculation of the sum 66 and the first and second differences 67, 68 of the first and second floating point numbers 112, 114.

In case of the floating point numbers 104, 106 being in binary floating point format, as shown in FIG. 2, the fields of the mapped first and second floating point numbers 108, 110 may comprise bits 18 with value zero padded to form digits in order to share the same fields as in case of the floating point numbers 100, 102 being in decimal floating point format. The padding process provides alignment of the floating point numbers for the rounding process. But the entire binary operand is not converted to a decimal operand. It is just aligned, so that when binary add/subtract operation is applied to a binary number, the same rounding logic can be used for a decimal add/subtract operation being applied to a decimal operand.

This mapping step S10, shown in FIG. 2, creates new floating point numbers 108, 110. Also, the guard bits 50 and the round bits 52 are padded with bits 18 in order to create a guard digit and a round digit of 4 bit length, as well as the most significant bits 48, which are padded to most significant digits 40.

Next, in step S12 a compressing function such as a carry save adder (CSA), for instance, is applied to the floating point numbers 108, 110. Thus, a guard digit 28 of zero, shown as four zeroes 58 in FIG. 2, a so-called 'hole', of the second floating point number 114 is generated by transforming the first and the second floating point number 108, 110 by the compressing function 30 in step S12 and creating the floating point numbers 112, 114, resulting also in the guard digit 28*b* and round digit 44*b*. The sticky field 54 may be reduced to a single sticky bit in this compressing process using, for example, an OR gate 91.

The final result 20 of the arithmetic operation may be determined by using, for instance, a decimal compound adder 34 in step S14, where performing an add/subtract operation with an injection rounding step. For decimal operands, this decimal compound adder 34 performs a decimal arithmetic operation, for binary operands this adder 34 performs a binary arithmetic operation. There, the final result 20 is selected as the sum 66 or the sum plus one 69, which are calculated in parallel, depending on digit overflow resulting from performing the arithmetic operation in the decimal compound adder 34. The final result 20 of the rounding process is then selected based on the injection carry values 16, 17, generated depending on the injection values 24, 26 and the end around carry signals 134, 136 based on the table 138 in FIG. 3. Injection values 24, 26 are constants depending on the rounding mode selected and on the least significant bit of a floating point number.

Step S16 shows the injection carry generation for the first rounding position 32, whereas step S18 shows the injection carry generation for the second rounding position 33. The injection carry values 16, 17 are fed to the decision table 138, shown in FIG. 2 and explained in FIG. 3. The output of table 138 is fed as input for the multiplexer 72 in order to build the final result 20 out of the result 130, the result plus one 132, and the least significant digit 60.

In case of the floating point numbers 104, 106 being in a binary floating point format, it may also be possible to use a select function to map the final result 20 of the arithmetic operation, being a binary add/subtract operation, back to the binary format.

An arithmetic logic circuitry 10 may also be configured to perform a floating point arithmetic operation on a first floating point number 100, 104 and a second floating point number 102, 106, wherein the first floating point number 100, 104 has a first magnitude and the second floating point number 102, 106 has a second magnitude, and wherein the first and second floating point numbers 100, 104; 102, 106 are both in either decimal or binary floating point format, and wherein the first floating point number 100, 104 is implemented with a higher precision than the second floating point number 102, 106, the method comprising (i) extending the second floating point number 102, 106 fields by padding to form a third floating point number 107 (not shown in FIG. 2) in order to share the same fields with the first floating point number 100, 104; (ii) executing the arithmetic operation on the first and third floating point numbers 100, 104; 107.

In FIG. 3, a selection table 138 for selecting a final result 20 of a floating point arithmetic operation according to an embodiment of the invention is shown. Depending on the end around carry signals 134, 136 of the results of the decimal compound adder 34, as well as the injection carry values 16, 17, a final result 20 of the result 130, and the least significant digit 60 or of the result plus one 69 and the least significant digit 60 is selected for the first rounding position 32. For the second rounding position 33 a final result 20 is selected from the result 130 or the result plus one 132 values depending on the end around carry signals 134, 136 of the result of the decimal compound adder 34 as well as the injection carry values 16, 17.

Figure 4:
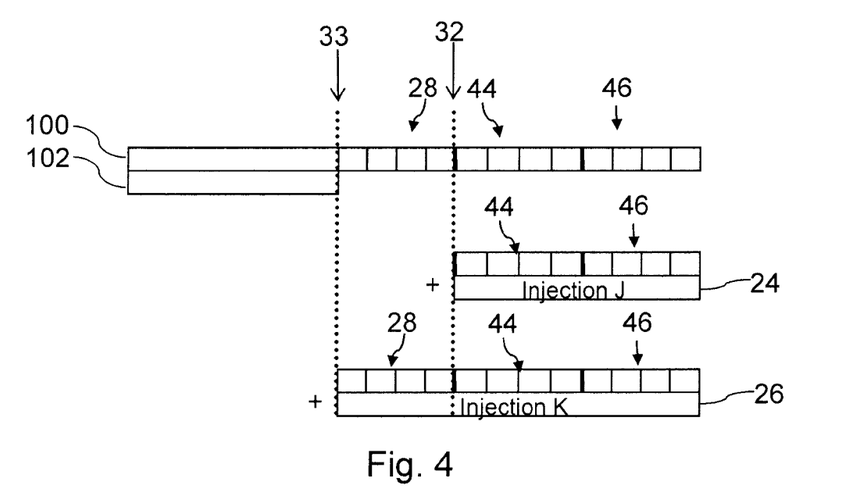
FIG. 4 shows a data representation for rounding in a floating point operation with decimal floating point numbers, in accordance with one or more aspects of the present invention.

FIG. 4 depicts a data representation for rounding in a floating point operation with decimal floating point numbers 100, 102, according to one or more embodiments of the present invention. Injection values 24, 26 are added at least at two rounding positions 32, 33 to the floating point numbers 100, 102 for rounding the final result 20 of the arithmetic operation. Injection values 24 are added at the position of the round digits 44 and the sticky digit 46, whereas injection values 26 are added at the position of the guard digit 28, the round digit 44 and the sticky digit 46.

Figure 5:
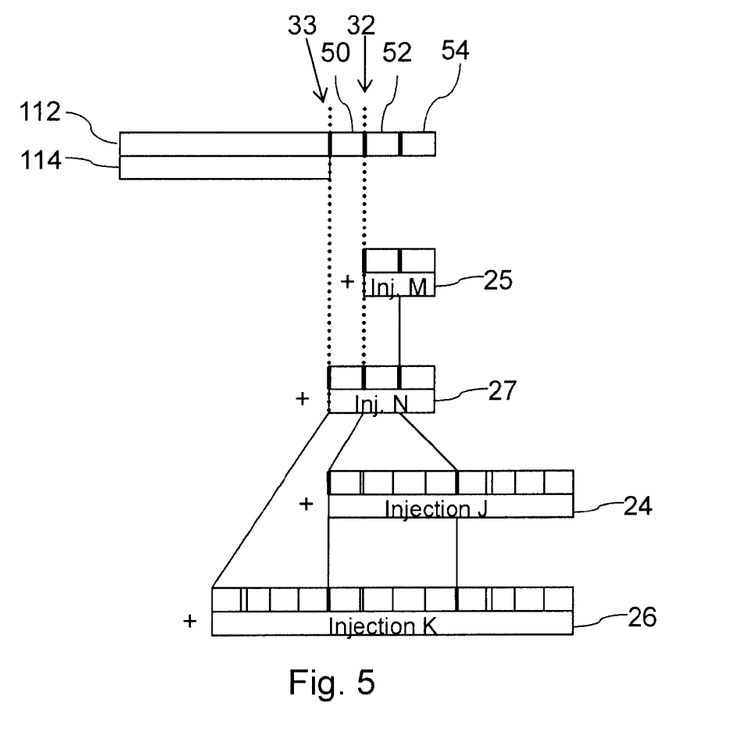
FIG. 5 illustrates a data representation for rounding in a floating point operation with binary floating point numbers, in accordance with one or more aspects of the present invention.

FIG. 5 depicts a data representation for rounding in a floating point operation with binary floating point numbers 112, 114, according to one or more embodiments of the present invention. In the case of binary floating point numbers, injection values 25 are principally added to the position of the round bit 52 and the sticky bit 54 for rounding at the first rounding position 32, whereas the injection values 27 are principally added the position of the guard bit 50, the round bit 52 and the sticky bit 54 for rounding at the second rounding position 33. For using the same decimal compound adder, also with the binary floating point numbers 112, 114 in the arithmetic operation, the decimal compound adder may be configured to do a binary operation (by not adding the previously mentioned plus six to each digit) and the binary floating point numbers 112, 114 are padded with bits 18 as well as the injection values 25, 27 are padded to decimal injection values 24, 26 and added as described in FIG. 4.

Figure 6:
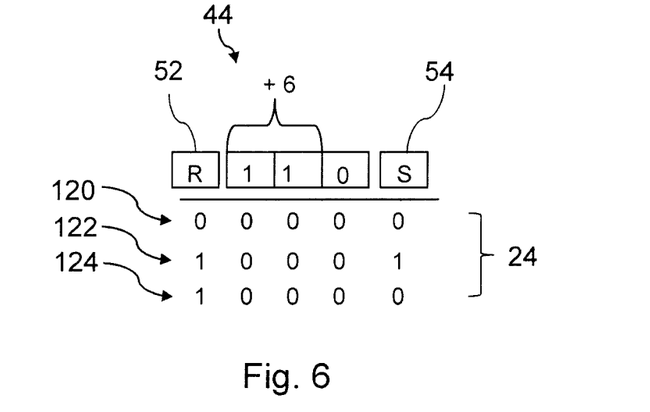
FIG. 6 shows injection values for rounding a result of an add floating point operation of binary floating point numbers at a first rounding position for different rounding modes, in accordance with one or more aspects of the present invention.

In FIG. 6, injection values 24 are shown for rounding a result of an add floating point operation of binary floating point numbers 112, 114 at a first rounding position 32 for different rounding modes according to an embodiment of the invention. A round digit 44 together with a sticky bit 54 is shown. The injection values 24 for the different rounding modes correspond to rounding to zero 120, rounding up 122 and rounding nearest up 124. Also, shown is a +6 added for decimal adding operation in the round digit 44.

Figure 7:
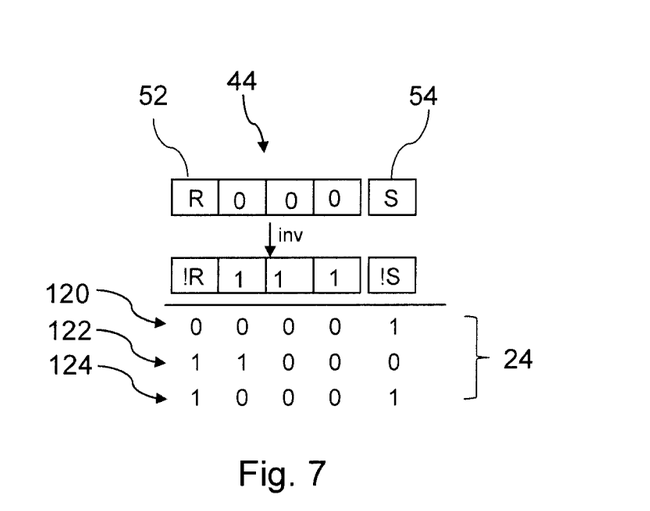
FIG. 7 shows injection values for rounding a result of a subtract floating point operation of binary floating point numbers at a first rounding position for different rounding modes, in accordance with one or more aspects of the present invention.

FIG. 7 shows the same injection values 24 for rounding a result of a subtract floating point operation of binary floating point numbers 112, 114 at a first rounding position 32 for different rounding modes according to one or more embodiments of the invention. The round digit 44 is first inverted, which is convenient for applying the subtract operation. The injection values 24 for the different rounding modes correspond to rounding to zero 120, rounding up 122 and rounding nearest up 124.

Figure 8:
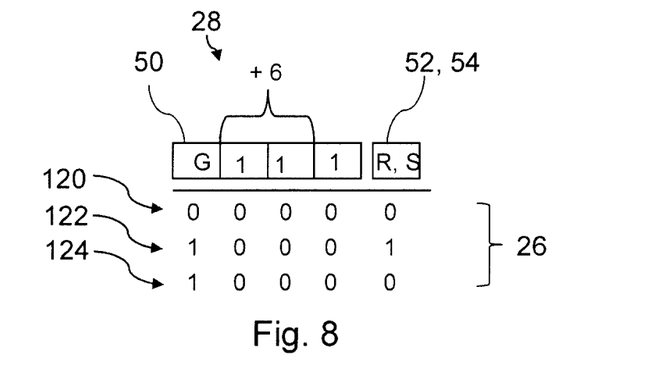
FIG. 8 depicts exemplary injection values for rounding a result of an add floating point operation of binary floating point numbers at a second rounding position for different rounding modes, in accordance with one or more aspects of the present invention.

FIG. 8 depicts injection values 26 for rounding a result of an add floating point operation of binary floating point numbers 112, 114 at a second rounding position 33 for different rounding modes, according to an embodiment of the invention. A guard digit 28, together with round bit 52 or sticky bit 54, is shown. The injection values 26 for the different rounding modes correspond to rounding to zero 120, rounding up 122 and rounding nearest up 124.

Figure 9:
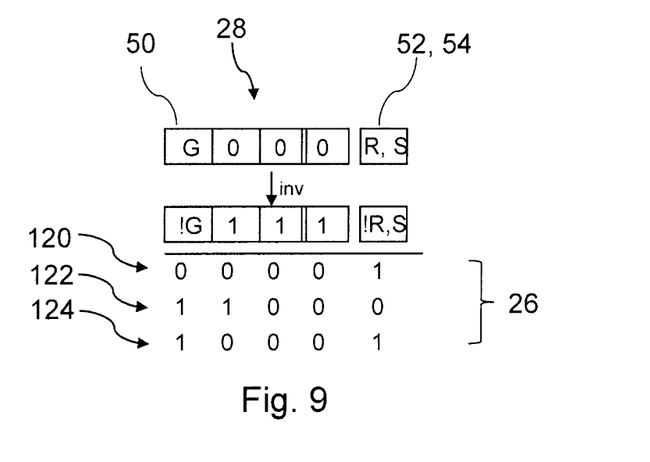
FIG. 9 depicts injection values for rounding a result of a subtract floating point operation of binary floating point numbers at a second rounding position for different rounding modes, in accordance with one or more aspects of the present invention.

In FIG. 9, injection values 26 are depicted for rounding a result of a subtract floating point operation of binary floating point numbers 112, 114 at a second rounding position 33 for different rounding modes according to an embodiment of the present invention. The guard digit 28 is first inverted, which is convenient for applying the subtract operation. The injection values 26 for the different rounding modes correspond to rounding to zero 120, rounding up 122 and rounding nearest up 124.

Figure 10:
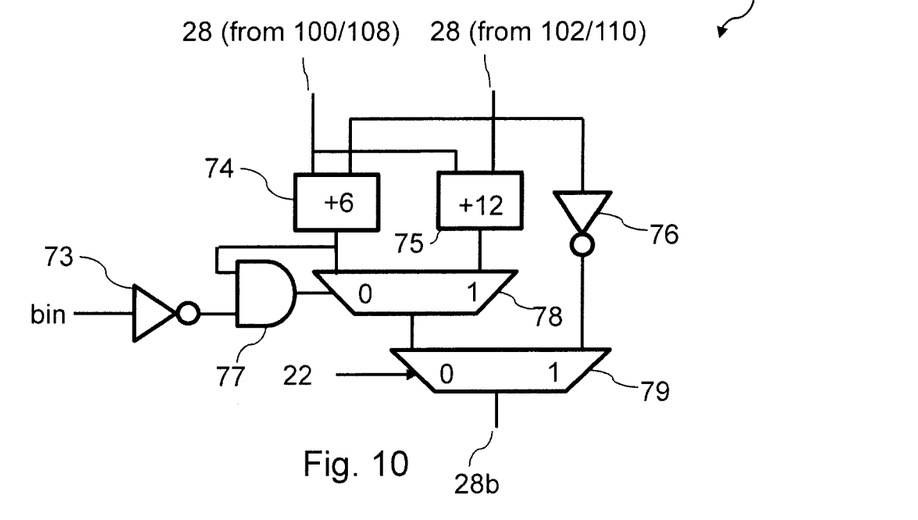
FIG. 10 shows one embodiment of a first part of a rounding logic of an arithmetic logic circuitry for rounding a result of a floating point operation of decimal or binary floating point numbers, in accordance with one or more aspects of the present invention.

FIG. 10 depicts a first part 10.1 of a rounding logic of an arithmetic logic circuitry 10 for rounding a result of a floating point operation of binary floating point numbers 112, 114 according to one or more embodiments of the present invention.

The arithmetic logic circuitry 10 for performing a floating point arithmetic add/subtract operation on a first floating point number 100, 104 and a second floating point number 102, 106 may be part of a data processing system 210 (FIG. 14), with the data processing system itself being below. The first floating point number 100, 104 may have a first magnitude and the second floating point number 102, 106, a second magnitude, and the first and second floating point numbers 100, 104; 102, 106 may both be in either decimal or binary floating point format. The arithmetic logic circuitry may be configured for implementing a method comprising (i) in case of the floating point numbers 104, 106 being in a binary floating point format, mapping the binary floating point numbers 104, 106 to a decimal floating point format, by padding bits 18 to form digits in order to share the same fields as in case of the floating point numbers 100, 102 being in a decimal floating point format; (ii) generating a guard digit 28 of zero 58 of at least one of the first or the second floating point number 100, 108; 102, 110 by transforming the first and the second floating point number 100, 108; 102, 110 by a compressing function 30; (iii) computing as a result 130 depending on the arithmetic operation a sum 66 of the transformed floating point numbers 112, 114, a first difference 67 or a second difference 68 of the transformed floating point numbers 112, 114, wherein for the first difference 67 the second floating point number 114 is subtracted from the first floating point number 112 and for the second difference 68 the first floating point number 112 is subtracted from the second floating point number 114 and computing a corresponding result plus one 132 by additionally adding a value of one to the result 130. Correspondingly a sum plus one 69, a first difference plus one 70 and a second difference plus one 71 is calculated; (iv) generating injection values 24, 26 for rounding a final result 20 in dependence of the first and second floating point numbers 100, 104; 102, 106 being in a decimal floating point format or a binary floating point format, of a rounding mode and of the arithmetic operation; (v) generating injection carry values 16, 17 based on the transformed first and second floating point numbers 112, 114 and the injection values 24, 26; and (vi) selecting the final result 20 from the result 130, the result plus one 132 and a least significant digit 60 based on the injection carry values 16, 17 and end around carry signals 134, 136 as is detailed in the table 138 contained in FIG. 3.

The part of the rounding logic, depicted in FIG. 10, gets as an input a guard digit 28 of a first floating point number 100, if in decimal format, or a padded guard digit 28 of a first floating point number 108, if in binary format and a guard digit 28 of a second floating point number 102, if in decimal format, or a padded guard digit 28 of a second floating point number 110, if in binary format. It also gets as an input a control signal 22 depending on the arithmetical operation. Then, the rounding logic, comprising adders 74, 75, 77, inverters 73, 76 and multiplexers 78, 79, determines a guard digit 28b after having performed a compression step S12 resulting in the floating point numbers 112, 114.

In case of the floating point numbers 104, 106 being in binary format, and in the case of an add arithmetic operation, a number of six and of twelve, respectively, for the second floating point number 106, is added in padding the decimal digit with a guard bit 50. The case of binary input is controlled by the input of the inverter 73.

Figure 11:
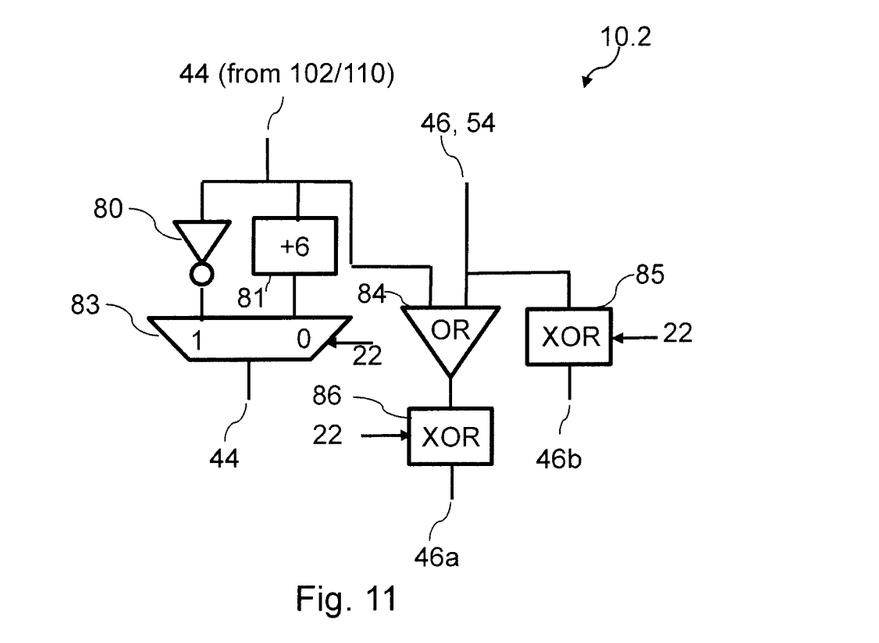
FIG. 11 shows one embodiment of a second part of a rounding logic of an arithmetic logic circuitry for rounding a result of a floating point operation of decimal or binary floating point numbers, in accordance with one or more aspects of the present invention.

Next, FIG. 11 depicts a second part 10.2 of a rounding logic of an arithmetic logic circuitry 10 for rounding a result of a floating point operation of decimal or binary floating point numbers according to an embodiment of the invention. Here, inputs of a round digit 44 of a floating point number 102, if in decimal format, or of a floating point number 110, if in binary format, a sticky digit 46 for decimal format, or 54 for binary format as well as a control signal 22, are fed to the rounding logic. The rounding logic, comprising adder 81, inverter 80, OR gates 82, 84, 91, XOR gates 85, 86 and a multiplexer 83, determines a round digit 44 as well as two sticky bits 46a and 46b for the rounding position 30 and 32.

Figure 12:
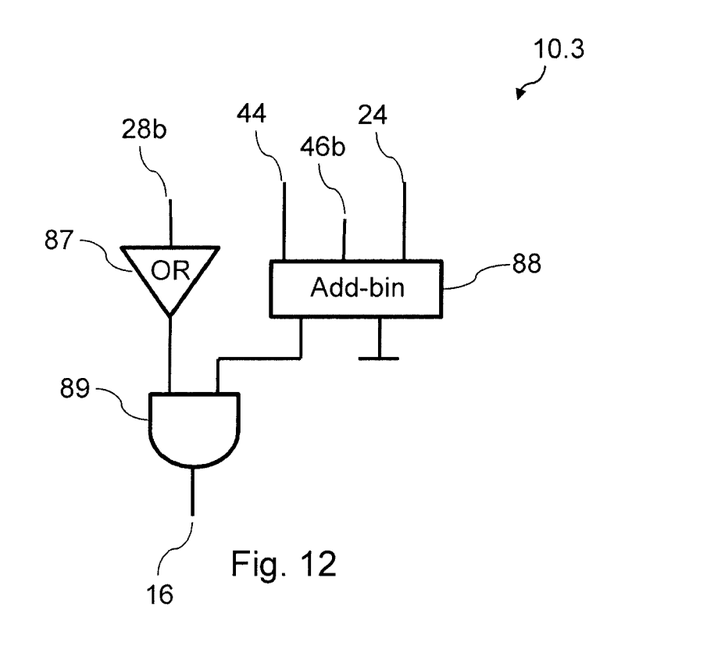
FIG. 12 depicts part of a rounding logic of an arithmetic logic circuitry for determination of a carry information at a first rounding position, in accordance with one or more aspects of the present invention.
Figure 13:
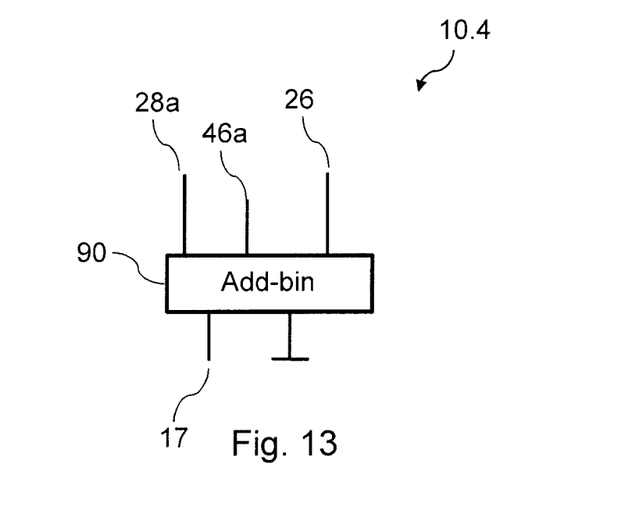
FIG. 13 shows part of a rounding logic of an arithmetic logic circuitry for determination of a carry information at a second rounding position, in accordance with one or more aspects of the present invention.

Then, FIG. 12 shows part 10.3 of a rounding logic of an arithmetic logic circuitry 10 for determination of an injection carry value 16 at a first rounding position 32 according to an embodiment of the invention. The rounding logic, comprising an OR gate 87, a binary adder 88 as well as an AND gate 89, determines from inputs of the guard digit 28b, the round digit 44, the sticky bit 46b as well as the injection values 24, an injection carry value 16, whereas the part 10.4 of the rounding logic, shown in FIG. 13 and comprising a binary adder 90, determines from inputs of a guard digit 28a, the sticky digit 46a as well as the injection values 26, an injection carry value 17.

Figure 14:
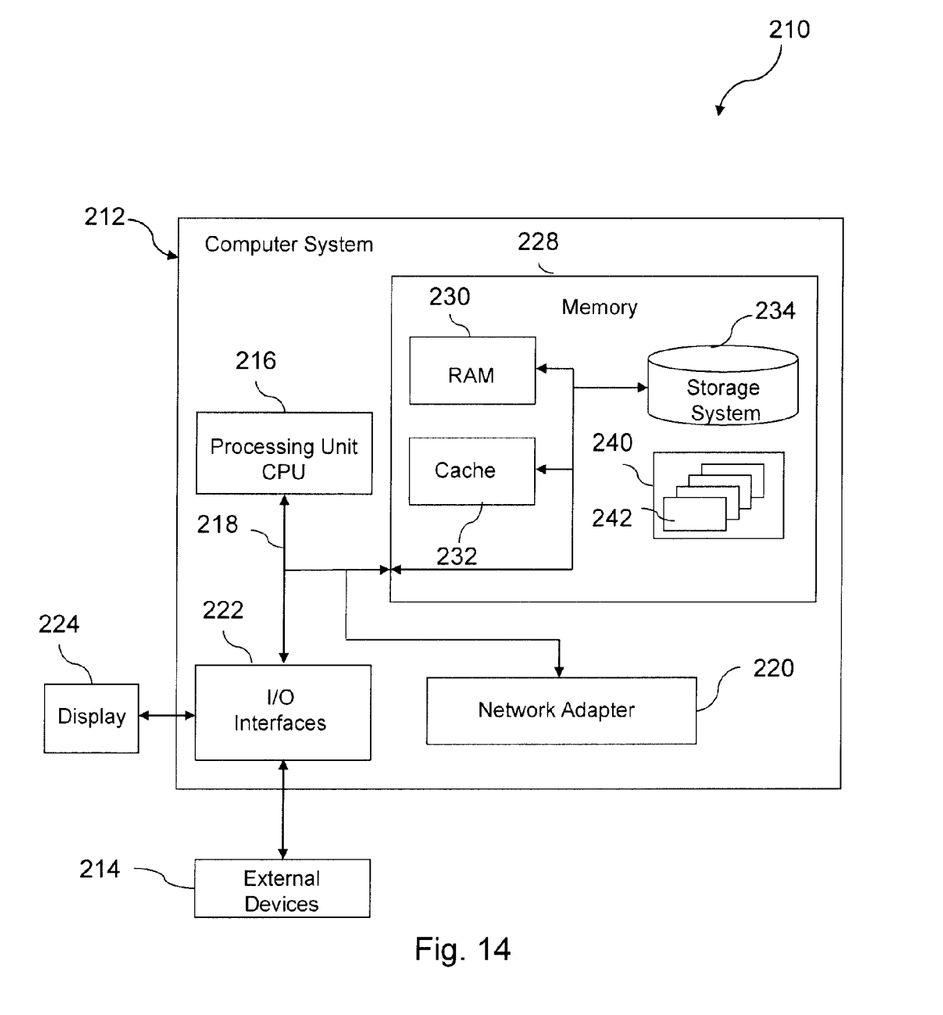
FIG. 14 shows an example embodiment of a data processing system with an arithmetic logic circuitry for implementing one or more aspects of the present invention.

FIG. 14 depicts an example embodiment of a data processing system 210 with an arithmetic logic circuitry 10 for implementing a method according to one or more aspects of the present invention. The arithmetic logic circuitry 10, which is not shown explicitly in FIG. 14, may be part of the processing unit 216 of data processing system 210.

Referring to FIG. 14, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210, there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 14, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein. Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to block diagrams of methods, apparatus (systems) and computer program products according to embodiments of the invention. It will be understood that each block of the flowchart illustrations and/or block diagrams, and combinations of blocks in the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the block diagram block or blocks.

Due to a further aspect of the invention, a data processing system for execution of a data processing program is proposed, comprising software code portions for performing a method described above.

The block diagrams in the FIGS. illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

What is claimed is:

1. A computer implemented method for performing a floating point arithmetic add/subtract operation on a first floating point number and a second floating point number, wherein the first floating point number has a first magnitude and the second floating point number has a second magnitude, and wherein the first and second floating point numbers are either in binary or decimal floating point format, the method comprising:
   in case of the floating point numbers being in a binary floating point format, mapping the binary floating point numbers to a decimal floating point format, by padding bits to form digits in order to share the same fields as in case of the floating point numbers being in a decimal floating point format;
   generating a guard digit of zero of at least one of the first or the second floating point number by transforming the first and the second floating point number by a compressing function;
   computing as a result depending on the arithmetic operation a sum of the transformed floating point numbers, a first difference or a second difference of the transformed floating point numbers, wherein for the first difference the second floating point number is subtracted from the first floating point number and for the second difference the first floating point number is subtracted from the second floating point number and computing a corresponding result plus one by additionally adding a value of one to the result;
   generating injection values for rounding a final result in dependence of the first and second floating point numbers being in a decimal floating point format or a binary floating point format, of a rounding mode and of the arithmetic operation;
   generating injection carry values based on the transformed first and second floating point numbers and the injection values;
   selecting the final result from the result, the result plus one and a least significant digit based on the injection carry values and end around carry signals.

2. The method of claim 1, wherein, in case of the floating point numbers being in a binary floating point format, the mapped floating point numbers fields comprising bits with value zero padded to form digits in order to share the same fields as in case of the floating point numbers being in a decimal floating point format.

3. The method of claim 1, further comprising generating injection carry values depending on the injection values if for rounding reasons the result plus one is selected for the final result.

4. The method of claim 1, further comprising:
   selecting the final result of the rounding process based on the injection carry values generated depending on the injection values as well as on the arithmetic operation being an add or a subtract operation.

5. The method of claim 1, further comprising:
   adding injection values at least at two rounding positions to the floating point numbers for rounding the final result of the arithmetic operation.

6. The method of claim 1, further comprising, in case of the floating point numbers being in a binary floating point format, using a select function to map the final result of the arithmetic operation back to the binary format.

7. The method of claim 1, further comprising rounding the final result of the arithmetic operation, wherein rounding the final result comprises:
   generating injection values depending on the floating point format;
   transforming the first and the second floating point number by a compressing function;
   detecting the rounding position depending on injection carry values and the end around carry signals;

combining the rounding process with a calculation of the sum and the first and second differences of the first and second floating point numbers.

8. The method of claim 1, further comprising determining the final result of the arithmetic operation by using a decimal compound adder.

9. The method of claim 1, further comprising selecting the final result depending on digit overflow resulting from performing the arithmetic operation in the decimal compound adder.

10. The method of claim 1, further comprising, in case of the floating point numbers being in binary format and in case of an add arithmetic operation, adding a number of six in padding a decimal digit with guard bits.

* * * * *